United States Patent [19]

Stuettler

[11] Patent Number: 6,040,852
[45] Date of Patent: *Mar. 21, 2000

[54] METHOD AND DEVICE FOR THE RECORDING AND REPRODUCTION OF STEREOSCOPIC VIDEO IMAGES

[75] Inventor: Herbert M. Stuettler, Rankweil, Austria

[73] Assignee: Leica Microsystems AG, Heerbrugg, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/663,306

[22] PCT Filed: Dec. 16, 1994

[86] PCT No.: PCT/EP94/04197

§ 371 Date: Jun. 26, 1996

§ 102(e) Date: Jun. 26, 1996

[87] PCT Pub. No.: WO95/18511

PCT Pub. Date: Jul. 6, 1995

[30] Foreign Application Priority Data

Dec. 29, 1993 [CH] Switzerland ............... 3890/93

[51] Int. Cl.[7] .................................... H04N 7/18

[52] U.S. Cl. .................... 348/43; 348/45; 348/46; 348/47; 348/51; 348/52

[58] Field of Search ............... 348/42, 43, 44, 348/45, 47, 49, 51, 52, 54, 56

[56] References Cited

U.S. PATENT DOCUMENTS

| 4,562,463 | 12/1985 | Litpon et al. ............... 348/43 |
| 5,329,365 | 7/1994 | Uz ............................ 348/469 |
| 5,416,510 | 5/1995 | Lipton et al. ............... 348/43 |
| 5,510,832 | 4/1996 | Garcia ....................... 348/56 |
| 5,539,464 | 7/1996 | Xu et al. .................... 348/388 |

Primary Examiner—Anand S. Rao
Attorney, Agent, or Firm—Foley & Lardner

[57] ABSTRACT

The invention concerns a method for the recording and reproduction of stereoscopic video images of scenes being observed, as well as a device for carrying out the method. The method makes it easier to record or reproduce images using conventional recording media. A half-image detection procedure is carried out before and/or after recording takes place to determine the association of a half-image with the corresponding frames of a left-hand or right-hand channel, or the association with each other of two frames in parallel channels.

20 Claims, 6 Drawing Sheets

| | | | | | | |
|---|---|---|---|---|---|---|
| VIDEO RECORDER TIMING | | | | | | |
| CAMERA A | HB/A1.1 | HB/A1.2 | HB/A2.1 | HB/A2.2 | HB/A3.1 | HB/A3.2 |
| CAMERA B | HB/B1.1 | HB/B1.2 | HB/B2.1 | HB/B2.2 | HB/B3.1 | HB/B3.2 |
| INPUT VCR | HB/A1.1 | HB/B1.2 | HB/A2.1 | HB/B2.2 | HB/A3.1 | HB/B3.2 |
| OUTPUT VCR | HB/A1.1 | HB/B1.2 | HB/A2.1 | HB/B2.2 | HB/A3.1 | HB/B3.2 |
| INPUT FRAMEGRABBER A | | | | | | |

WITH INTERPOLATION

| | | | | | | |
|---|---|---|---|---|---|---|
| INPUT FRAMEGRABBER B | HB/A1.1 | HB/B1.2 | HB/A2.1 | HB/B2.2 | HB/A3.1 | HB/B3.2 |
| OUTPUT FRAMEGRABBER A | VB/A0 | VB/A0 | VB/A1 | VB/A1 | VB/A2 | VB/A2 |
| OUTPUT FRAMEGRABBER B | VB/B0 | VB/B0 | VB/B1 | VB/B1 | VB/B2 | VB/B2 |
| DISPLAY | VB/A0 VB/B0 | VB/A0 VB/B0 | VB/A1 VB/B1 | VB/A1 VB/B1 | VB/A2 VB/B2 | VB/A2 VB/B2 |
| TIMING | |10 ms| | | | | |

6,040,852

METHOD AND DEVICE FOR THE RECORDING AND REPRODUCTION OF STEREOSCOPIC VIDEO IMAGES

BACKGROUND

This application relates to a method and a device for the recording and reproduction of stereoscopic video images. One such method is disclosed in German Publication DE 41 34 033 C1. This method is disadvantageous in that the reproduction quality of the stereo images represented on the monitor is inadequate.

SUMMARY OF THE INVENTION

It is therefore an object of the invention to find a simple and reliable method and a device with which steroscopic video image reproduction quality is ensured.

U.S. Pat. No. 5,084,763 discloses a method and a device for displaying stereoscopic television pictures. The latter can be transmitted and recorded as fields using time-division multiplex, the changeover between left and right channels being performed during reproduction with the timing of a field period. Signal processing is undertaken separately for each channel, and the two channels are displayed on the monitor with double frequency in order to suppress flicker. Nothing is said as to how a distinction is achieved between the images of the right and left channels during reproduction by the VTR.

The video images are generated by two image-acquiring devices, both the signal of the camera assigned to the left eye and the signal of the camera assigned to the right eye having as usual even and odd fields. The invention also comprises an embodiment in which for the sake of simplicity only one field each is generated per image-acquiring device.

In a preferred exemplary embodiment, the signals of the two cameras are fed to an interface (video signal coupler) at whose output the even fields of one camera and the odd fields of the other camera are present successively in time. The output signal of the interface is fed to the recording device.

The assignment of the video fields in the reproduction of the recorded video signal has normally been rendered possible by an identifying signal added to the video signal during recording. This identifying signal has indicated the connection between even and odd fields and right and left cameras. In the reproduction of the recorded video signal, this identifying signal has been used to split the video signal into two channels, one for images assigned to the right eye and one for images assigned to the left eye. On the basis of the invention, this identifying signal is no longer mandatory and is therefore provided only in the case of a modified embodiment.

If, however, the identifying signal is not detected at the reproducing device, for example during a disturbance, the right-left separation of the reproduced video signal cannot be carried out satisfactorily. This problem is also eliminated by the invention. According to the invention, a method is specified in which the separation of the reproduced video signal is possible without the recording of an additional identifying signal.

Coupling a synchronization signal to a field achieves the advantage that this signal is directly a component of the video signal, with the result that detection is more easily possible than if it was a question of—as known—a separate signal.

One advantage of the invention resides in that the image acquiring devices detect and record by channel odd fields, on the one hand, and even fields, on the other hand. In each case, one field of the frames consisting of two fields is detected per channel and recorded in a recording device. For reproduction, the fields are further processed by channel and respectively fed to a raster image buffer which is preferably connected in each case to an interpolator for generating the missing field. After joining the image generated by the interpolator with the field already present in the raster image buffer, there is produced per channel a frame consisting of two fields which are read out by a frame grabber with 4-fold picture frequency and made available for reproduction to a reproducing monitor. Whereas the image acquiring devices acquire the frames or raster images with a picture frequency of, for example, 25 Hz, in the reproducing monitor frames or raster images of the first and second channel or, in other words, the right and the left frames or raster images are displayed with a picture frequency of 100 Hz. This leads to a flicker-free impression of the video image for the viewer. A brighter image is achieved by means of the display of raster images instead of fields.

BRIEF DESCRIPTION OF THE DRAWINGS

Further details of the invention are to be gathered from the claims, the Figures and associated parts of the description. In particular, in this case of the Figures

Identical reference symbols signify identical components. Identical reference symbols with different indices signify similar components.

DETAILED DESCRIPTION OF PREFERRED EMBODIMENTS

List of Reference Symbols and Definition of Terms

Within the meaning of the invention:

A stereoscopic video image is two correlated frames of a left and right image channel, the frames having at least one video field (HB), but being designed as a raster image, as the case may be, in which they are constructed from a correlated pair (VB) of two fields (HB). Within the meaning of the invention, such a pair (VB) can also consist of two interlaced fields (HB) or of two simultaneously present and thus no longer separated fields (progressive scan).

Interpolated fields (HB) are fields which have been obtained by computational evaluation of existing image information from a field (HB). Raster images may have been obtained both from HB/A and from HB/B.

The designation HB/A stands for fields (HB) of one image channel, while the designation HB/B stands for fields of the associated other image channel. The index X signifies the progressive numbering of the respective field (HB). The index 1 or 2 stands for the respective even or odd field (HB). As a rule, one even and one odd field (HB) are recorded when recording only one field each per frame channel. However, this is not mandatory inasmuch as an additional, for example, synchronization signal at an least one of the two field signals can be used to assign them to the correct channel.

A and C stand for contact parts which are connected to one another in the operational case.

1 Video recording device; this includes, for example,: video recorders, video disk devices, digital storage devices of every sort.
2 Video reproducing device; this includes all devices with which it is possible to reproduce recordings of devices according to 1.
3 Camera electronic system; this includes all devices which electronically acquire images acquired by an optoelectronic recording device and render them processible.
4 Field detector; this includes all signal analyzing devices which can detect a field (for example, an even one) or distinguish it from an associated second field (for example an odd one) and, as the case may be, can undertake suitable changeovers for the purpose of relaying signals.
5 Image acquiring device; this includes still or full-motion video cameras, any CCD or other optoelectronic array circuitry, etc.
6 Video signal coupler; this includes all interfaces which switch signals from two parallel channels—in particular alternating—to an electronic path. They can be designed, in particular, as a graphics card.
7 Camera synchronization system; this includes synchronizing elements which both synchronize two camera electronic systems with one another and, as the case may be, clock further elements for the purpose of image processing and/or generate signals which can be recorded if required on video data media.
8 Raster image buffer; this includes all storage elements which can store at least two correlated fields of a frame or at least one raster image.
9 Framegrabber; this includes all electronic circuits which convert signals of a video raster image or video field into signals which can be further processed digitally, and which condition them for display on a computer monitor.
11 Monitor; this includes all image displaying devices and displays, in particular cathode ray tubes with a short persistence (for example under 10 ms) as well as LCD displays, etc.
12 Interpolator; this includes devices which create two correlated fields from one field by filling the line interspaces of a field with interpolated image information, preferably obtained from the image information of the two lines of the relevant field which bound the line interspaces.
13 Video divider; divides a video signal from one path into at least two paths so that the same signals are present on both paths.
14 Video amplifier and clamping device; correspond to the conventional devices in video signal processing; these can also be dispensed with under some circumstances, for example in the case of variant E for variant 3.
15 Field buffer; this includes all those storage devices, and therefore also raster image buffers, as the case may be, which can store at least one field.
16 Raster image buffer with interpolation on frame-grabber; these are integrated components which create by interpolation from a field a raster image which they render capable of being retrieved in a form which can be processed by a computer. They also serve to increase the frequency of the displayable images by comparison with the recording frequency on the video recording device.

Figure 1:
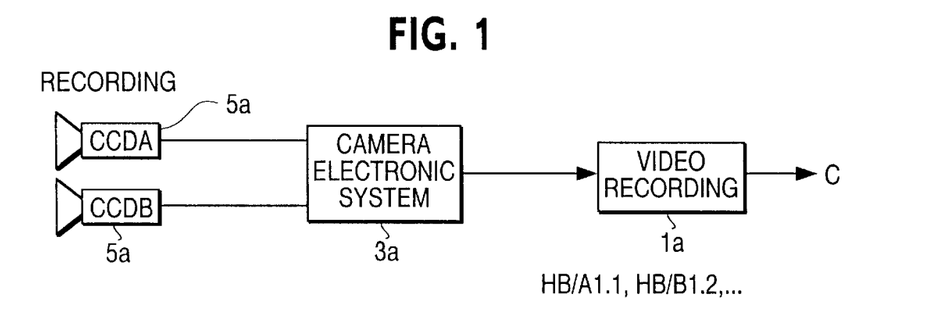
FIG. 1 shows a first exemplary embodiment of a recording part of a device according to the invention with two coordinated CCDs.
Figure 2:
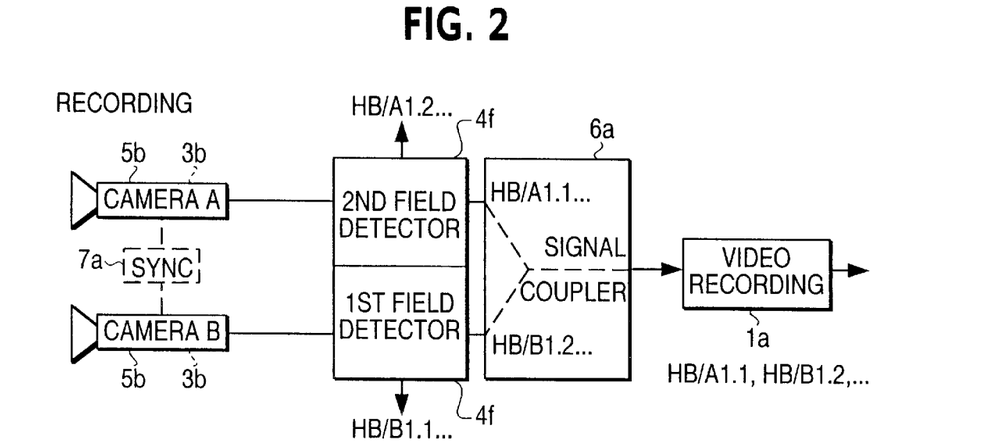
FIG. 2 shows a second exemplary embodiment of a recording part with two synchronously controlled video cameras and a video recording device.
Figure 3:
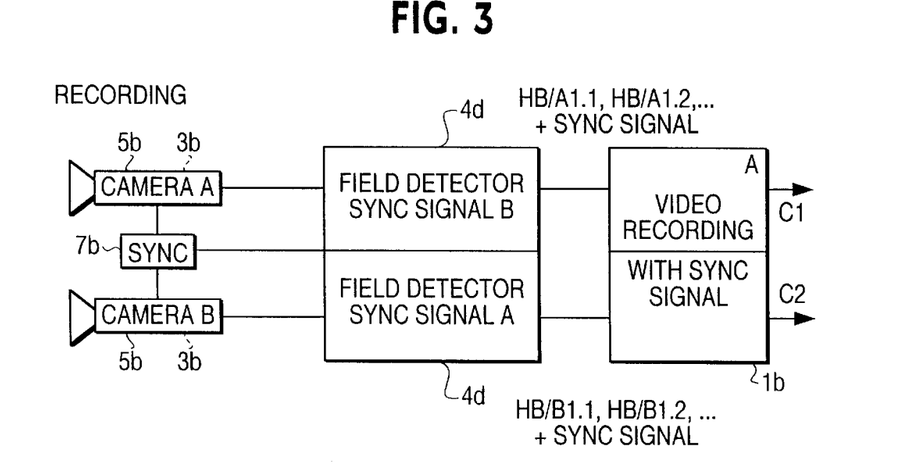
FIG. 3 shows a third exemplary embodiment of a recording part with two video recording devices.

The device for the recording and reproduction of stereoscopic video images consists, on the one hand, of a recording part and, on the other hand, of a reproducing part. Different embodiments of the recording part are represented in FIG. 1, FIG. 2 and FIG. 3. Exemplary embodiments of the reproducing part are represented in FIG. 4 to FIG. 8. The exemplary embodiments of the recording parts, on the one hand, and the reproducing parts, on the other hand, can be combined at will, it being preferred for the third exemplary embodiment of the reproducing part in accordance with FIG. 8 to be assigned to the third exemplary embodiment of the recording part in accordance with FIG. 3, and the two other exemplary embodiments of the reproducing part in accordance with FIG. 4 to FIG. 7 respectively being assigned to the first and second exemplary embodiments of the recording part in accordance with FIG. 1 and FIG. 2, respectively.

According to a first exemplary embodiment of the recording part in accordance with FIG. 1, the frames of a stereo image pair which are assigned to the right and left eyes are recorded by coordinated cameras 5a. The output signals of the two cameras 5a each have even and odd fields HB/A1.1, HB/A1.2 and HB/B1.1, HB/B1.2, respectively. The output signals of the cameras 5a are fed to a camera electronic system 3a in which the fields HB are sequentially changed over, the even field HB of the first channel being followed by an odd field HB of the second channel.

Consequently, one channel detects only even fields HB, and the other channel detects only odd fields HB, and these are relayed for the purpose of video recording to a recording device 1a. According to a second exemplary embodiment of the receiving part in accordance with FIG. 2, there are provided for this purpose two field detectors 4f which respectively detect even or odd fields HB and relay them to a signal coupler 6a which alternately accepts the incoming fields HB and feeds them to the recording device 1a. The field detectors 4f are clocked with the field frequency. A commercially available video recorder is used as recording device 1a.

For the purpose of reproduction, this video recorder is used as a reproducing device 2a which feeds the stored video data to a video divider 13a. The video divider 13a divides the signals into two channels. Before the further processing of the signals allotted to the two channels, these signals are normalized in accordance with an existing standard by means of a video amplifier and a video clamping device 14a. Thereafter, the even and odd fields HB are separated from one another in the two channels, so that even fields are processed in one of the channels and odd fields are processed in the second channel, see FIG. 6.

Video field detectors 4b, for example type SM II VI.4 from Fast Electronic GmbH, are used for the purpose of separation. By contrast with the alternative in accordance with FIG. 6, in the alternative in accordance with FIG. 7 a control signal s is fed to the second channel. It is therefore possible to control the relay of the fields in the other field detector 4c so as to ensure the synchronization of the fields HB of different channels.

Figure 4:
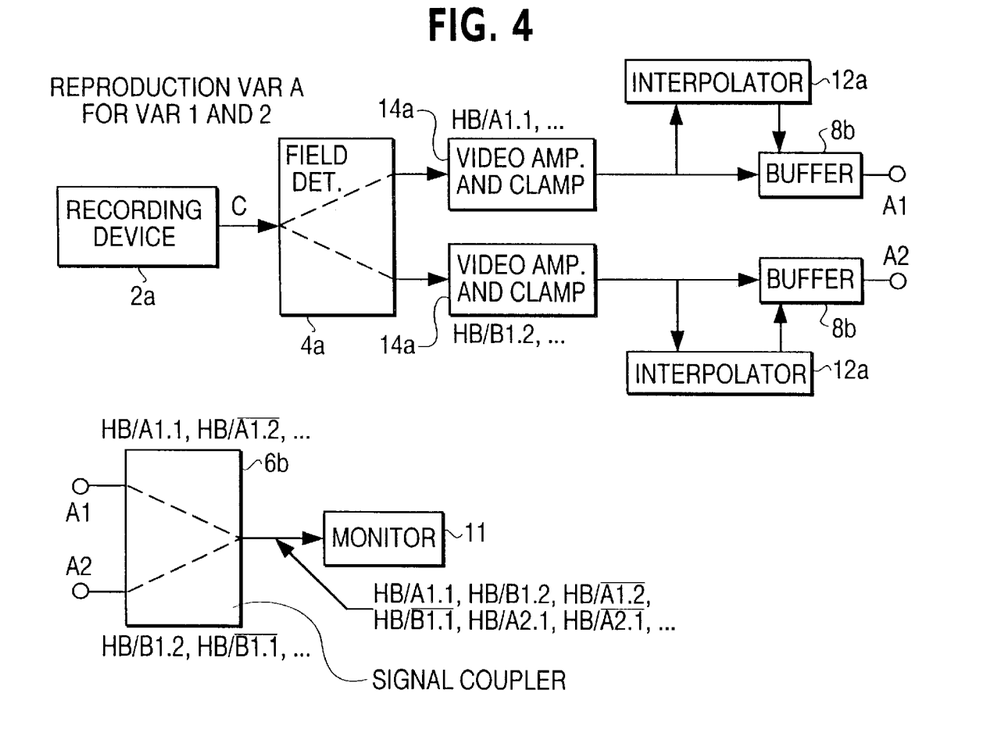
FIG. 4 shows a first exemplary embodiment of a reproducing part of a device according to the invention with an interpolation circuit and an interface which permits the display of pairs (VB) of fields on a monitor.

According to the exemplary embodiment in accordance with FIG. 4, the fields HB are respectively fed to a raster image buffer 8b which is connected to an interpolator 12a. In the interpolator 12a, the missing fields HB are formed in each case and added to the existing fields HB, with the result that complete frames TB having in each case an odd and an even field HB are available. These frames TB are then fed as raster images to a signal coupler 6b which feeds these frames TB sequentially to a reproducing monitor 11 for the purpose of displaying the video image.

Figure 5:
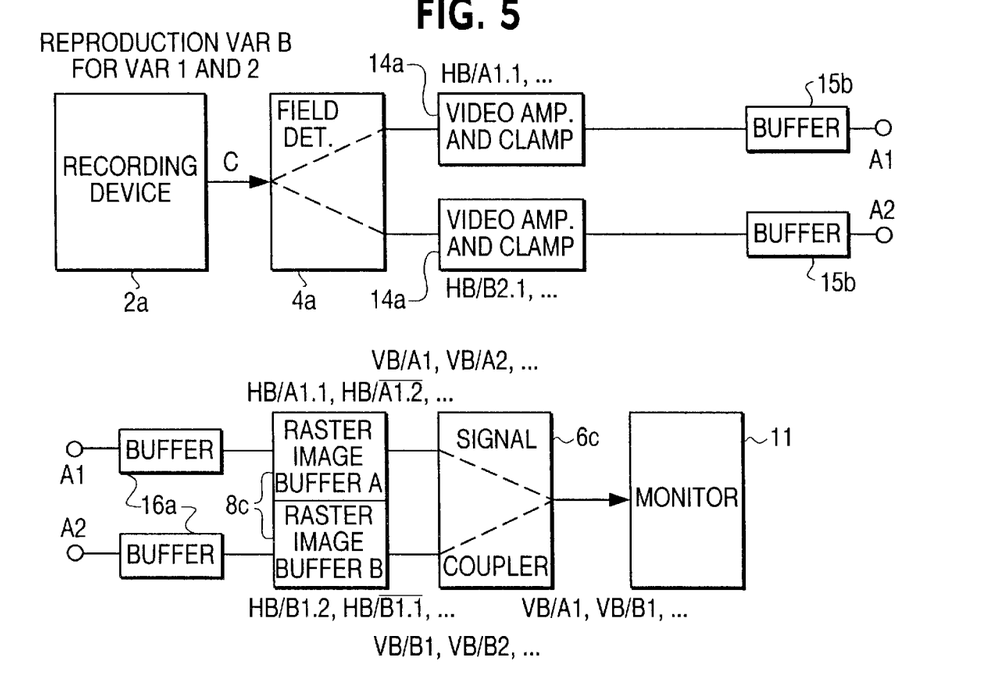
FIG. 5 shows a second exemplary embodiment of a reproducing part in which progressively scanned raster images can be alternately represented on the monitor.
Figure 6:
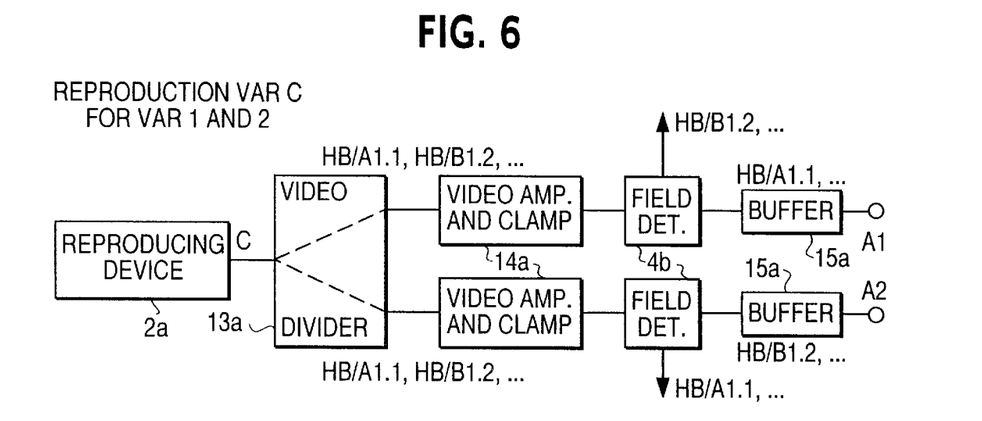
FIG. 6 shows an alternative for the first part of the reproducing part according to FIG. 4 or FIG. 5.
Figure 7:
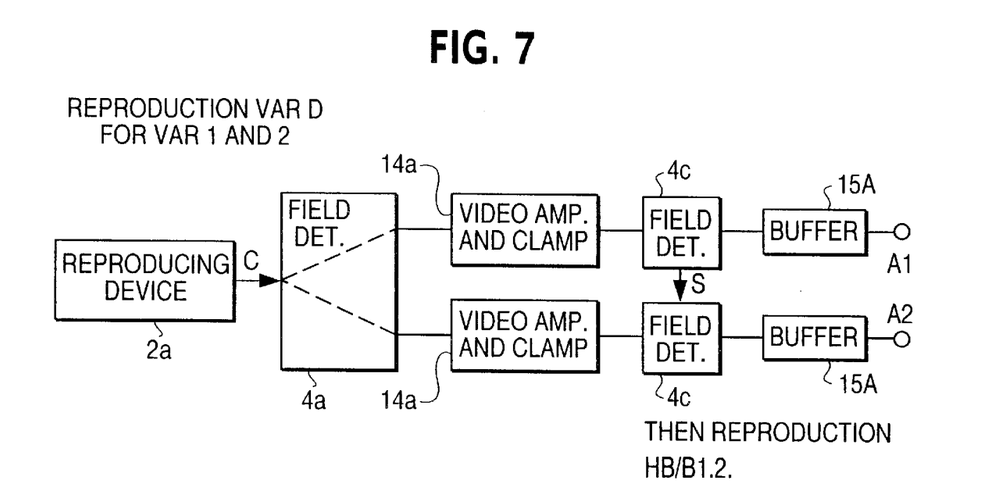
FIG. 7 shows a further alternative for the first part of the reproducing part according to FIG. 4 or FIG. 5.
Figure 8:
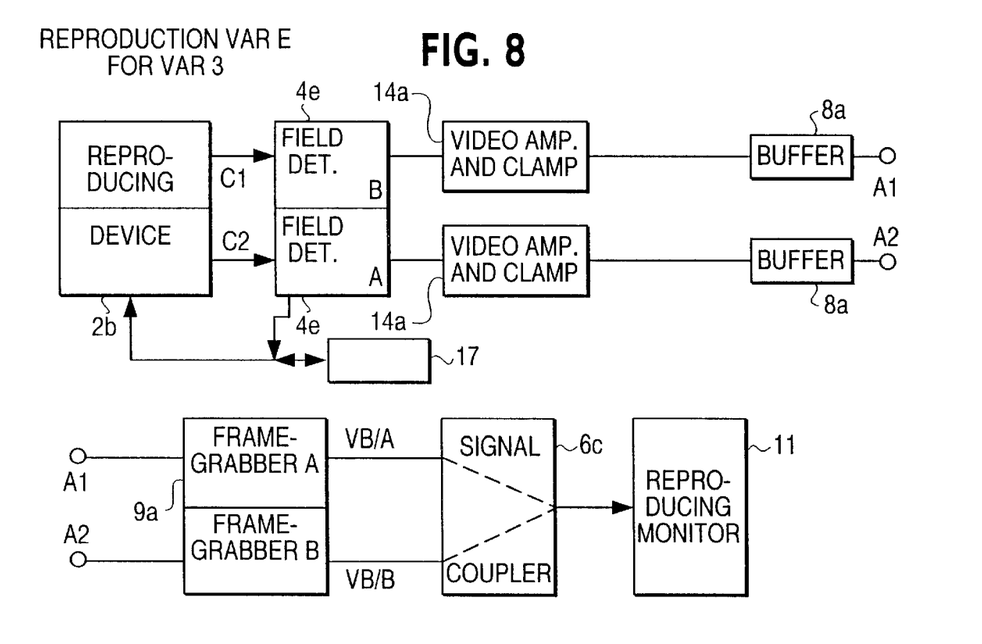
FIG. 8 shows a third exemplary embodiment of a reproducing part for the continuous processing of complete pairs (VB) of fields (HB) from two video recording devices.

According to a further exemplary embodiment in accordance with FIG. 5, the fields HB coming from the video clamping device 14a are fed by channel to a field buffer 15b and thereafter to a raster image buffer 16a. Using a framegrabber, the fields HB are buffered in interpolated form as complete frames or raster images in the raster image buffer 16a and then fed respectively to a raster image buffer 8c. Connected downstream of the raster image buffer 8c is a signal coupler 6c which is designed in accordance with the exemplary embodiment in accordance with FIG. 4 and is operated with the 4-fold picture frequency, with the result that the right and left raster images are alternately fed to the reproducing device 11 with a frequency of 100 Hz or 120 Hz, respectively.

A further exemplary embodiment of the recording device in accordance with FIG. 3 differs from the exemplary embodiment in accordance with FIG. 2 by virtue of the fact that in addition to the fields HB the synchronization signal 7b, which controls the cameras 5b, is also transmitted and stored on the video recording device 1b. A signal coupler is not provided, since the frames of the first and left channel are recorded on different memory areas of the video recording device 1b. For the purpose of reproducing the stereoscopic video image, the fields are read out from the reproducing device 2b by channel and respectively fed to a field detector 4e. For each channel, a video clamping device 14a and a raster image buffer 8a as well as a frame-grabber 9a are connected downstream, with the result that as in the preceding exemplary embodiments the stored fields are completed by interpolated fields to form complete frames, and are alternately transmitted by a signal coupler 6c for the purpose of reproduction on a reproducing monitor 11. They can now be monitored free from flicker by comparison with the frame frequency per camera of, for example, 25 Hz with the 4-fold frequency of, for example, 100 Hz.

Figure 9:
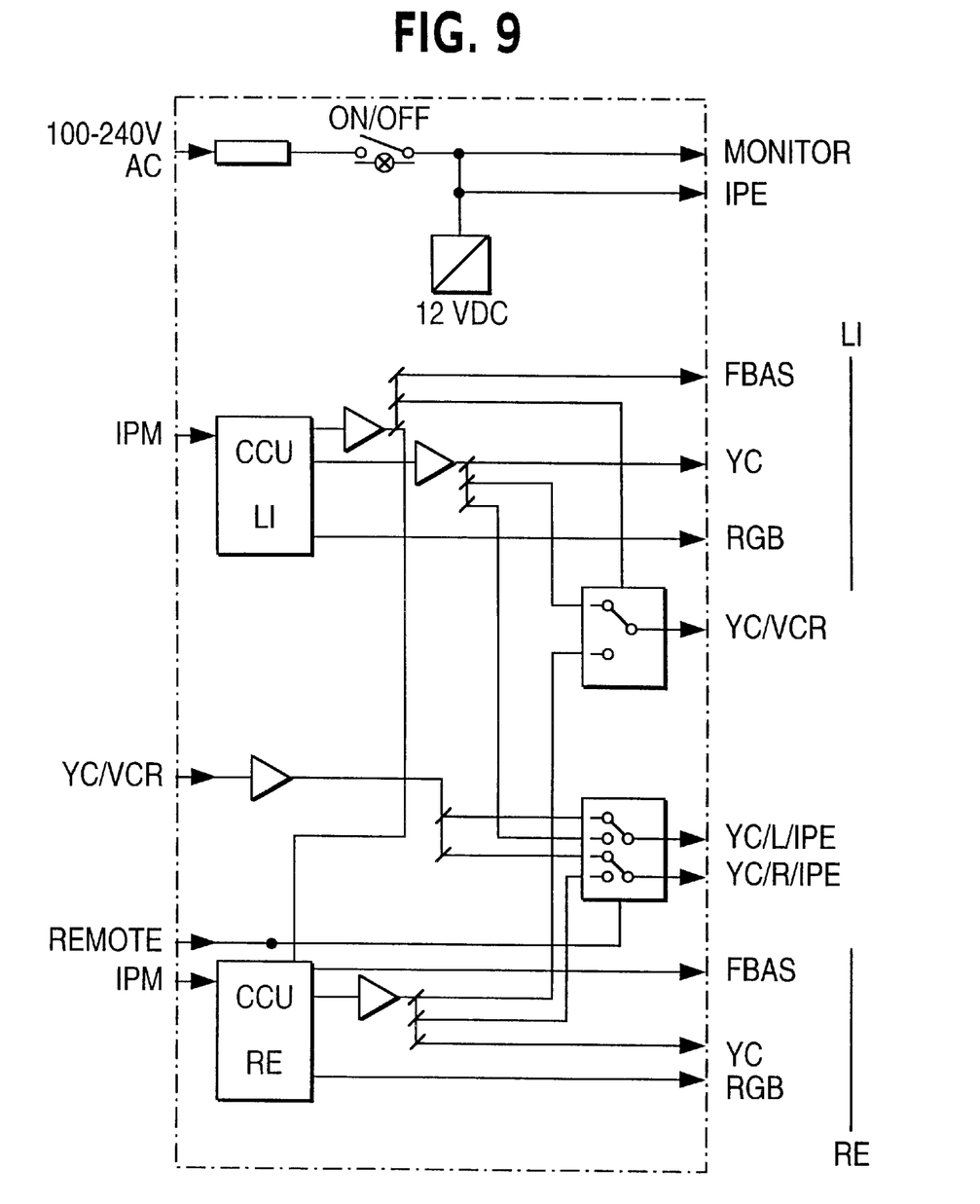
FIG. 9 shows a practical example of an implemented interface with a video recorder input YC/VCR, a video output YC/VCR and two video camera inputs IPM for recording stereoscopic images on a conventional video recorder.

A practical example of an interface is represented in FIG. 9. The interface comprises the two field detectors, assigned by channel, and the signal coupler connected thereto. The output signals of the right and left cameras are present at the input IPM of the interface. These are processed by channel in a camera control unit (CCU), the left channel being processed in the CCU/Li and the right channel being processed in the CCU/Re. The output signals of these camera control units CCU are then, on the one hand, fed via a respective amplifier device to a live mode circuit in which the signals of the right and left frames can be changed over, and then relayed as output signals YC/L/IPE and YC/R/IPE via a left and right channel, respectively, of a signal processing unit (not represented) for the purpose of being displayed on a reproducing monitor. On the other hand, the output signals are fed to a control circuit in which they are conditioned for recording on a video recorder and are fed to a video recorder as output signals YC/VCR. Further signals FBAS, YC and RGB usual for displaying an image are optionally generated at the outputs of the interface.

Furthermore, an output signal of a video recorder can be applied to an input YC/VCR of the interface so that after said output signal has been fed to the live mode circuit the signal recorded on the video recorder is available at the output of the interface for the purpose of being displayed on the reproducing monitor. A further remote input of the interface renders possible as a remote control the optional through-connection of the signal recorded on the video recorder or of the signal acquired by the camera. A conventional power supply unit for providing the power supply of the interface is represented in the upper part of FIG. 9.

Figure 10:
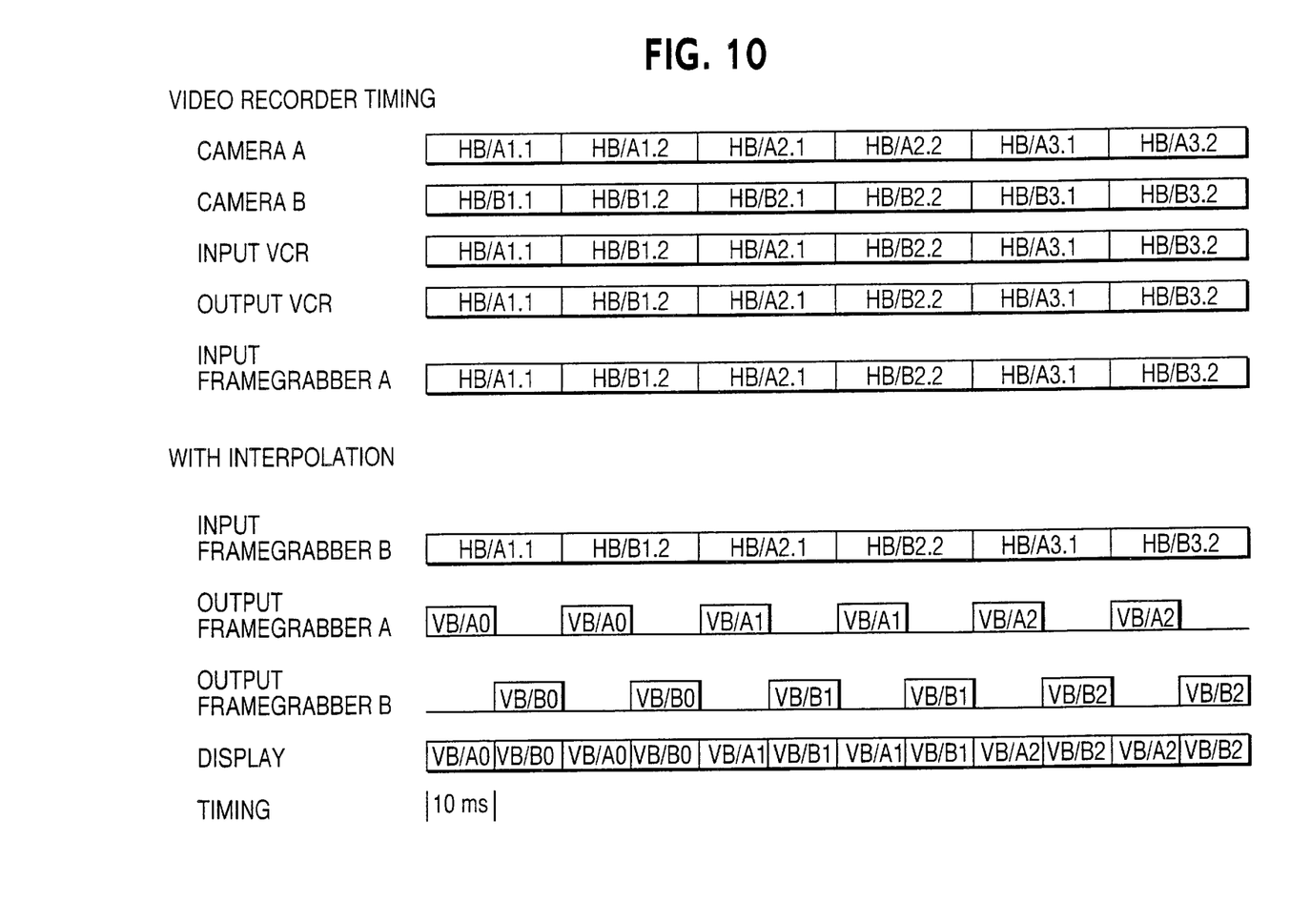
FIG. 10 shows a temporal progression of the signal sequence in a preferred exemplary embodiment of the invention with raster image display on the monitor.

The reproduction of the complete frames with 4-fold frequency is illustrated in the timing diagram in accordance with FIG. 10. Each camera acquires the frames by means of interlaced even and odd fields HB. The picture frequency of the fields is, for example, 50 Hz, while the picture frequency of the frames is 25 Hz. The recording device VCR records the fields, it being the case that there is alternating storage of the odd fields by a first channel and of the even fields by the second channel, see Input VCR.

Later, a further field HB is added by channel to the stored fields HB by interpolation, the images completed by channel now being relayed as raster images at an interval of 10 ms, for example, to the reproducing monitor for the purpose of reproducing the video image. The picture frequency of the frames is increased to 100 Hz by means of the correspondingly higher readout frequency, for example in the framegrabber or in the signal coupler. The frames are now present as raster images at this frequency of 100 Hz, there being an alternating display on the reproducing monitor of the raster image of one channel and then of the raster image of the other channel.

I claim:

1. A method for the recording and reproduction of stereoscopic video images of observed scenes, the video images constructed by two coordinated image-acquiring devices (5a, 5b) such that the images include at least a right and a left frame for a right and a left image channel, the frames constructed in each case from at least one even or odd field (HB) or from respectively at least one correlated pair (VB) of an even and an odd field (HP), wherein during recording a recording device (1a, 1b) and/or a reproducing device (2a, 2b) are alternatingly or simultaneously fed fields (HB), respectively correlated to form a scene, from the two image-acquiring devices (5a, 5b), or two pairs (VB), respectively correlated to form a scene, of fields from the two image-acquiring devices (5a, 5b), without compression of a field, and wherein at least one of the fields (HB) or one of the pairs (VB) of fields is detected during the reproduction of the stereoscopic video images such that the fields (HD) or pairs (VB) of fields are assigned to an associated left or right image channel in order, subsequently, to process further all the images (HB, VB) associated with the left channel only in the left channel and all the images (HB, VB) associated with the right channel only in the right channel, and only after separate further processing to combine them alternately via a video signal coupler with a frequency such that when the combined signal is reproduced on a monitor, the monitor shows no flickering and avoids an interlaced appearance of an odd field of the left channel with an even field of the right channel and further avoids an appearance of a first field of a first channel with said first field of said first channel repeated immediately thereafter.

2. A method according to claim 1, wherein the left and right frames are acquired by the respectively assigned left or right image-acquiring device (5a), each including a CCD (5a), two CCDs (5a) being read out by only a common camera electronic system (3a) such that in an alternating fashion only an even field (HB) is acquired by one CCD (5a) and only an odd field (HB) is acquired by the other CCD (5a) and applied to the output of the camera electronic system (3a), so that a single video signal consisting essentially of a right and a left field (HB) is fed to the recording device (1a) and/or the reproducing device (2a).

3. A method according to claim 1, wherein left and right frames respectively including a pair (VB) of in each case two correlated fields (HB), are acquired by in each case a left and a right image-acquiring device, including a left and a right video camera (5b) with a dedicated camera electronic system (3b) in each case, the acquiring operation being clocked or synchronized in the two cameras (5b), whereupon there is available downstream of each camera output a conventional video signal from which at least one of the two fields (HB) of a respective pair (VB) is detected and whereupon after each such detection one of the two fields (HB) is blanked, with the result that thereafter an even field (HB) remains for further processing in one channel and an odd field in the other channel, whereupon the signals of these fields (HB) are fed via said video signal coupler (6a) alternately to the recording device (1a) and/or the reproducing device (2a), wherein said recording device is a VCR video recorder.

4. A method according to claim 1, wherein left and right frames respectively having a pair (VB) of in each case two fields (HB) are acquired by in each case a left and a right image acquiring device, each including a conventional video camera (5b) with a dedicated camera electronic system (3b) in each case, the acquiring operation being clocked or synchronized in the two cameras (5b), whereupon there is available downstream of each camera output a conventional video signal from which at least one of the two fields (HB) of the respective pair (VB) is detected and provided with an additional synchronization signal from a camera synchronization system (7b), whereupon all the fields (HB) or pairs (VB) of fields (HB) are fed to the recording device (1b) and/or the reproducing device (2a, 2b) or are recorded in two independent channels by said recording device.

5. A method according to claim 4, wherein the fields (HB) with assigned synchronization signals are detected at the outputs (C1, C2) of the two channels of the reproducing device (2b), and the synchronization signal is subtracted from the signal of the relevant field (HB) and fed to a synchronization control system for the reproducing device (2b) to ensure the temporal synchronism of the two channels, and wherein all the fields (HB) or pairs (VB) of fields (HB) of each channel are fed to a dedicated raster image buffer (8a) from which they are available by channel for further processing with a four-fold horizontal deflection frequency.

6. A method according to claim 5, wherein the frames are read out as raster images from the raster image buffers (8a) by framegrabbers (9a) progressively by line and fed to said video signal coupler (6c), from which the frames of one channel are fed at a frequency four times the horizontal deflection frequency, in a fashion alternating with the frames of the other channel to a reproducing monitor (11).

7. A method according to claim 2, wherein a video signal at the output of the reproducing device (2a) is fed to a single field detector (4a) with an integrated video divider, in which the first field (HB/A1.1 . . . ) of the video signal is detected and fed via the video divider to the first channel, while the second field (HB/B1.2 . . . ) is fed to the second channel so that in each channel a field (HB) of its assigned frame can be processed, the signals of the two fields (HB/A1.1 . . . and HB/B1.2 . . . ) each being fed to an interpolator (12a) and simultaneously to a raster image buffer (8b), each interpolator (12a) assembling the respectively missing lines between the field of its channel by means of generated lines to form a second field (HB) and feeding the latter further, to the respective raster image buffer so that a complete frame or a pair (VB) of two correlated fields can be retrieved in the raster image buffer (8b) for further processing.

8. A method according to claim 7, wherein the frames are read out as raster images from the raster image buffers (8b) by framegrabbers (9a), progressively by line or as temporally interlaced even and odd fields (HB) and fed to a video signal coupler (6c), from where the raster images (VB) or all the fields (HB) are fed in temporal sequence to a reproducing monitor (11) at a frequency four-fold a horizontal deflection frequency.

9. A method according to claim 2, wherein a video signal at the output of the reproducing device (2a) is fed to a video divider (13a) in which all the fields (HB) are divided into a first and a second image processing channel each having an amplifying and clamping device (14a) and wherein by means of one field detector (4b) each, one of the two fields (HB) is detected and deleted from the respective processing channel, while the respectively remaining field (HB/A1.1 . . . , HB/B1.2 . . . ) is fed to a field buffer (15a) each, from which the fields are available for further processing.

10. A method according to claim 3, wherein a video signal at the output of the reproducing device (2a) is fed to a single field detector (4a) with an integrated video divider, in which the first field (HB/A1.1 . . . ) of the video signal is detected and fed via the video divider to the first channel, while the second field (HB/B1.2 . . . ) is fed to the second channel so that in each channel only one field (HB) of its assigned frame can be processed, the signals of the two fields (HB/A1.1 . . . and HB/B1.2 . . . ) being fed to one field buffer (15b) each, from which they are fed to one raster frame buffer (16a) each, wherein a raster image (VB) is generated from each field (HB) of a channel by interpolation of the buffered only one field, wherein during each interpolation operation the respectively missing lines in the field of its channel are assembled by means of generated lines to form a second field (HB), the latter being assembled with the respective original field (HB) to form a complete frame or to form a pair (VB) of two correlated fields (HB) for the purpose of further processing, the frames being fed in each channel to a common video signal coupler (6c) which alternately relays the two raster images of the two channels to the monitor (11) with a frequency high enough to avoid flickering.

11. A method according to claim 1, further comprising two field detectors (4c) in the two channels wherein either the assignment of one of the fields (HB) is detected in one of the two channels and a control signal (s) is fed to the second channel after temporal expiry of the detected field (HB), or the assignment of the fields is detected in one channel for the even fields and in the second channel for the odd fields.

12. A method according to claim 1, wherein for the purpose of further processing the video signals in the two channels, each field (HB) is stored in a field buffer (15b), and in order to derive a raster image or a pair (VB) of two correlated fields (HB) from one field (HB), the number of lines of the field (HB) is doubled by means of interpolation and the right and left frames or raster images are displayed in temporal sequence with a fourfold horizontal deflection frequency on a screen (11).

13. A method for the recording and reproduction of stereoscopic video images of observed scenes, the video images constructed by two image-acquiring devices (5a, 5b) such that the images include at least a right and a left frame for a right and a left image channel, the frames constructed in each case from at least one even or odd field (HB) or from respectively at least one correlated pair (VB) of an even and an odd field (HB), wherein during recording a recording device (1a, 1b) and/or a reproducing device (2a, 2b) are alternatingly or simultaneously fed even or odd fields (HB) for one channel and odd or even fields (HB) for the other channel, respectively correlated to form a scene, from the two image-acquiring devices (5a, 5b), and wherein at least one of the fields (HB) is detected during the reproduction of the stereoscopic video images such that the fields (HB) are assigned to an associated left or right image channel in order, subsequently, to process further all the images (HB) associated with the left channel only in the left channel and all the images (HB) associated with the right channel only in the right channel, and only after separate further processing to combine them alternately via a video signal coupler with a frequency such that when the combined signal is reproduced on a monitor, the monitor shows no flickering and avoids an interlaced appearance of an odd field of the left channel with an even field of the right channel and further avoids an appearance of a first field of a first channel with said first field of said first channel repeated immediately thereafter.

14. A method according to claim 13, wherein before displaying an image on a monitor omitted odd or even fields of one channel and omitted even or odd fields of the other channel are reproduced by interpolation and complete frames (VB) are displayed on the monitor.

15. A method according to claim 13, wherein left and right frames respectively including a pair (VB) of in each case two correlated fields (HB), are acquired by in each case a left and a right image-acquiring device, including a left and a right video camera (5b) with a dedicated camera electronic system (3b) in each case, the acquiring operation being clocked or synchronized in the two cameras (5b), whereupon there is available downstream of each camera output a conventional video signal from which at least one of the two fields (HB) of a respective pair (VB) is detected and whereupon after each such detection one of the two fields (HB) is blanked, with the result that thereafter an even field (HB) remains for further processing in one channel and an odd field in the other channel, whereupon the signals of these fields (HB) are fed via said video signal coupler (6a) alternately to the recording device (1a) and/or the reproducing device (2a).

16. A method according to claim 15, wherein a video signal at the output of the reproducing device (2a) is fed to a single field detector (4a) with an integrated video divider, in which the first field (HB/A1.1 . . . ) of the video signal is detected and fed via the video divider to the first channel, while the second field (HB/B1.2 . . . ) is fed to the second channel so that in each channel only one field (HB) of its assigned frame can be processed, the signals of the two fields (HB/A1.1 . . . and HB/B1.2 . . . ) being fed to one field buffer (15b) each, from which they are fed to one raster frame buffer (16a) each, wherein a raster image (VB) is generated from each field (HB) of a channel by interpolation of the buffered only one field, wherein during each interpolation operation the respectively missing lines in the field of its channel are assembled by means of generated lines to form a second field (HB), the latter being assembled with the respective original field (HB) to form a complete frame or to form a pair (VB) of two correlated fields (HB) for the purpose of further processing, the frames being fed in each channel to a common video signal coupler (6c) which alternately relays the two raster images of the two channels to the monitor (11) with a frequency high enough to avoid flickering.

17. A method according to claim 10, wherein said frequency is four-fold a horizontal deflection frequency.

18. A method according to claim 16, wherein said frequency is four-fold a horizontal deflection frequency.

19. A method for the recording and reproduction of stereoscopic video images of observed scenes, the video images constructed by two coordinated image-acquiring devices (5a, 5b) such that the images include at least a right and a left frame for a right and a left image channel, the frames constructed in each case from at least one even or odd field (HB) or from respectively at least one correlated pair (VB) of an even and an odd field (HB), wherein during recording a recording device (1a, 1b) and/or a reproducing device (2a, 2b) are alternatingly or simultaneously fed fields (HB), respectively correlated to form a scene, from the two image-acquiring devices (5a, 5b), or two pairs (VB), respectively correlated to form a scene, of fields from the two image-acquiring devices (5a, 5b), without compression of a field, and wherein at least one of the fields (HB) or one of the pairs (VB) of fields is detected during the reproduction of the stereoscopic video images such that the fields (HB) or pairs (VB) of fields are assigned to an associated left or right image channel in order, subsequently, to process further all the images (HB, VB) associated with the left channel only in the left channel and all the images (HB, VB) associated with the right channel only in the right channel, and only after separate further processing to combine them alternately via a video signal coupler with a frequency such that when the combined signal is reproduced on a monitor, the monitor shows no flickering, and wherein each signal for each channel displayed on the monitor contains full picture information because of progressively scanned display of all information of an odd field and an even field in a respective channel within the time of a standard field.

20. A method according to claim 19, wherein either odd or even field information of one channel is interpolated from respective field information.

* * * * *